US005774331A

United States Patent [19]

Sach

[11] Patent Number: 5,774,331
[45] Date of Patent: Jun. 30, 1998

[54] PORTABLE WORKSTATION HAVING ENVIRONMENTALLY SEALED COMPONENTS

[75] Inventor: Gary M. Sach, Villa Park, Calif.

[73] Assignee: Raytheon Company, Los Angeles, Calif.

[21] Appl. No.: 944,219

[22] Filed: Oct. 6, 1997

Related U.S. Application Data

[63] Continuation of Ser. No. 641,931, May 1, 1996, abandoned.

[51] Int. Cl.$^6$ ................................ G06F 1/16; H05K 5/06
[52] U.S. Cl. ...................... 361/683; 361/686; 361/687; 361/725
[58] Field of Search .................................. 361/670–687, 361/724–727; 364/708.1; G06F 1/16

[56] References Cited

U.S. PATENT DOCUMENTS

| | | | |
|---|---|---|---|
| 5,187,645 | 2/1993 | Spalding et al. | 361/686 |
| 5,305,183 | 4/1994 | Teynor | 361/686 |
| 5,347,292 | 9/1994 | Ge et al. | 345/74 |
| 5,430,607 | 7/1995 | Smith | 361/683 |
| 5,430,608 | 7/1995 | Honda et al. | 361/683 |
| 5,555,489 | 9/1996 | Keskinen | 361/683 |

*Primary Examiner*—Lynn D. Feild
*Attorney, Agent, or Firm*—David W. Collins; Leonard A. Alkov; Glenn H. Lenzen, Jr.

[57] ABSTRACT

A miniaturized manportable tactical workstation that has a single power supply that provides power for all of the electronic components thereof. The portable workstation includes a housing having a rotatable top cover that houses a display panel. The top cover is opened to expose a screen of the display panel. The housing encloses a hard drive receiver into which a removable hard drive is inserted. A two-slot VME processor box is disposed in the housing and receives a VME processor card that is slid into the VME processor box from one side of the workstation. An air filter and a fan are disposed in the housing and draw air through the housing to cool the electronic components of the workstation. A keyboard is provided that is exposed to a user when the top cover is opened to expose the display screen. The single power supply provides supply voltages and timing signals to the display panel, the keyboard, the VME processor card, the hard drive, and the fan. The use of a single power supply reduces the size and weight of the workstation and thus provides a miniaturized tactical workstation that is portable and that may be easily carried by an operator in tactical military situations.

16 Claims, 3 Drawing Sheets

PORTABLE WORKSTATION HAVING ENVIRONMENTALLY SEALED COMPONENTS

This is a continuation of application Ser. No. 08/641,931 filed May 1, 1996 now abandoned.

BACKGROUND

The present invention relates generally to computer workstations, and more particularly, to a miniaturized man-portable tactical workstation that uses a single power supply, and has substantially reduced size and weight compared with available systems to provide a portable, field deployable tactical workstation.

Existing portable tactical workstations, as compared to conventional laptop computers, for example, are relatively large and have required several individual power supplies to power different components of the workstation. For example, one power supply is typically used to power a liquid crystal display panel, another is used to power a keyboard, processor, and hard drive. Consequently, the use of multiple power supplies increases the size and weight of conventional workstations. In particular, one prior tactical workstation developed by the assignee of the present invention weighs on the order of thirty-five pounds. The relatively heavy weight of this workstation makes it difficult for personnel to carry it while in the field, such as when traversing a stream or river or when traversing through rough terrain, for example. Accordingly, it would be an advance in the art to have a portable workstation that has reduced size and weight and that is easy to carry.

Accordingly, it is an objective of the present invention to provide for a miniaturized tactical workstation that has a single power supply that powers all components. It is a further objective of the present invention to provide for a miniaturized tactical workstation that has substantially less size and weight compared with available systems. It is yet another objective of the present invention to provide for a miniaturized tactical workstation that is portable and that may be easily carried by an operator in tactical military situations.

SUMMARY OF THE INVENTION

To meet the above and other objectives, the present invention provides for a portable miniaturized tactical workstation that has a single power supply that is used to provide power for all of the electronic components of the workstation. The present miniaturized tactical workstation has a size that is approximately one half the size of a currently available system developed by the assignee of the present invention, and has a weight that is forty percent less than the currently available system.

More particularly, the portable miniaturized tactical workstation comprises a housing with a rotatable top cover that houses a display panel. The cover may be opened to expose the display screen of the display panel. The housing is designed to house a hard drive receiver into which a removable hard drive is inserted. A two-slot VME processor box is disposed in the housing and is designed to receive two VME cards that are slid into the VME processor box from one side of the workstation. The acronym VME stands for VersaModule Europa, which is a commersial bus/crate standard for modular computer systems, which is defined in ANSI/IEEE Standard 1014–1987, and in particular a publication entitled "IEEE Standard for a Versatile Backplane Bus: VMEbus". An air filter is disposed on a front panel of the housing, and a fan is disposed adjacent a side of the housing and is used to draw air through the filter and housing to cool the electronic components of the workstation. A keyboard and a touch panel display are disposed on a flat surface of the housing that are exposed to a user when the top cover is opened and the display screen is exposed. Light emitting diodes are provided to indicate the status of the power supply.

The single power supply is disposed on an inside surface of a rear panel of the workstation. The single power supply is used to provide supply voltages and timing signals to the display panel, the keyboard, the VME processor cards, the hard drive, the light emitting diodes and the fan. Consequently, the use of a single power supply reduces the size and weight of the workstation.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
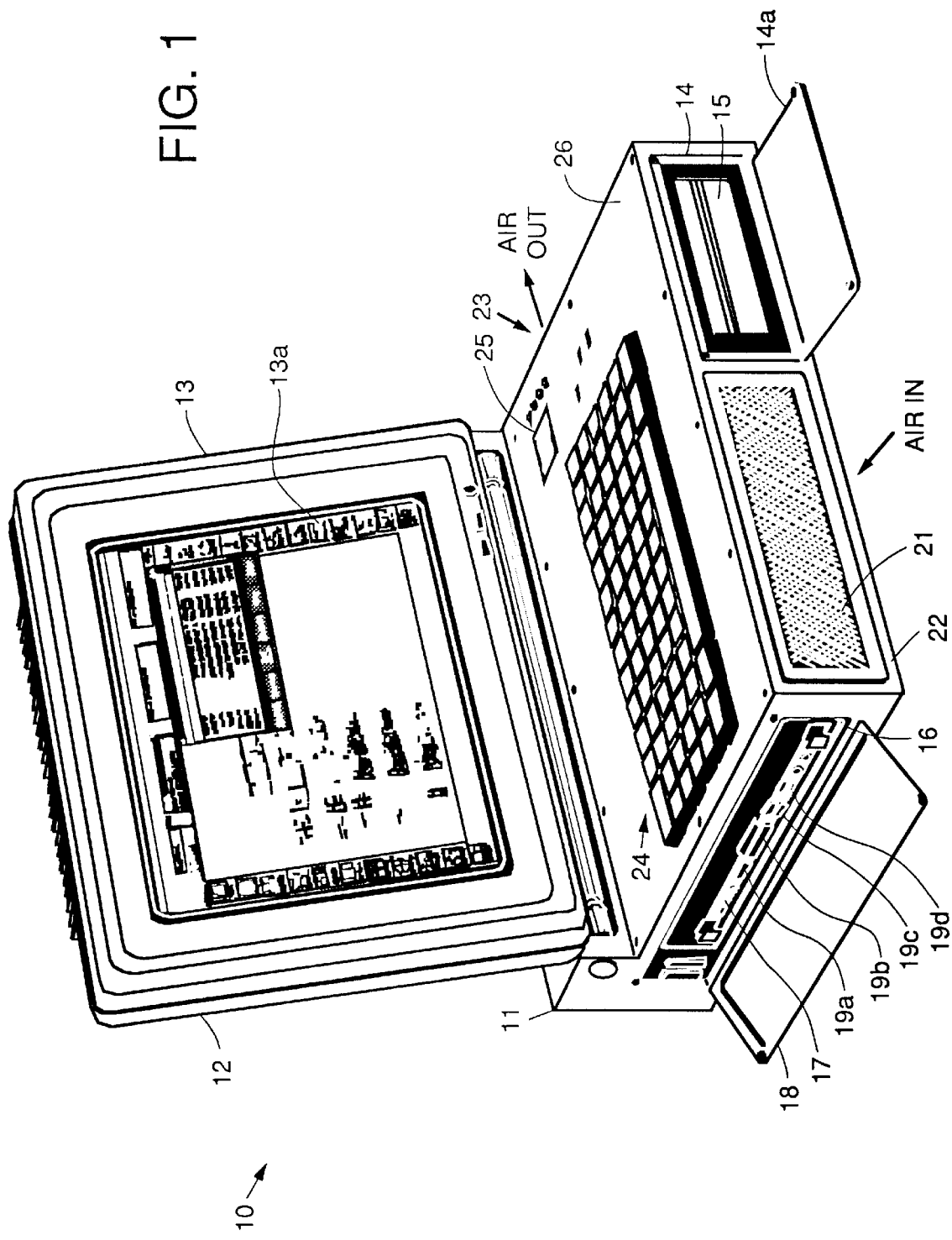
FIG. 1 illustrates a perspective view of a portable miniaturized tactical workstation in accordance with the principles of the present invention.
Figure 2:
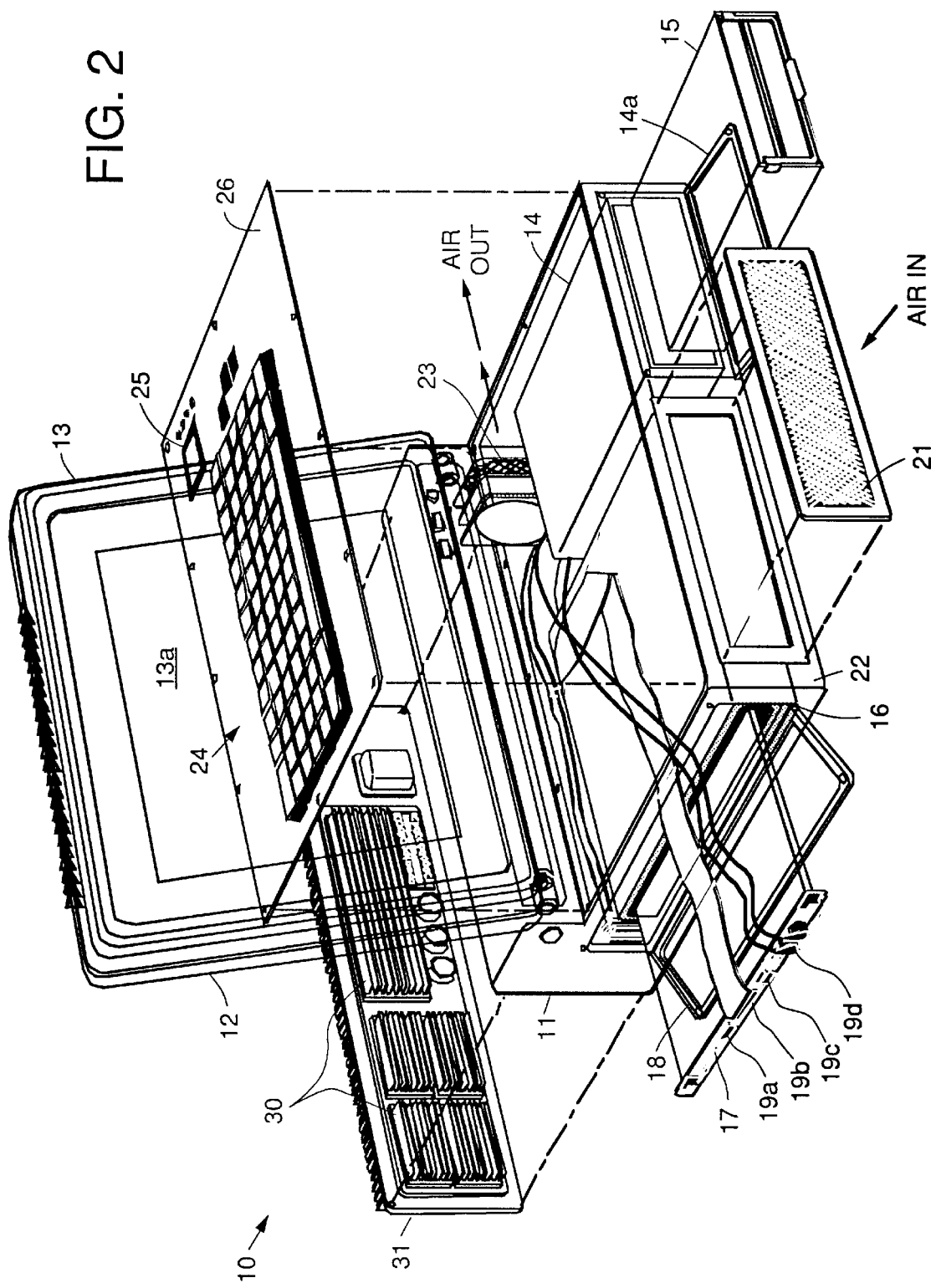
FIG. 2 illustrates an exploded view of the portable miniaturized tactical workstation of FIG. 1.

Referring to the drawing figures, FIG. 1 illustrates a perspective view of a portable miniaturized tactical workstation 10 in accordance with the principles of the present invention. FIG. 2 illustrates an exploded view of the portable miniaturized tactical workstation 10. The portable miniaturized tactical workstation 10 comprises a housing 11 that has a rotatable top cover 12 that houses a display 13, such as a liquid crystal display panel 13, a field emission display panel 13, or a plasma display panel 13, for example. The cover 12 is lockable and rotatable and is rotated upward to expose a viewing screen 13a of the display panel 13. A display panel 13 used in a reduced to practice embodiment of the present invention is a 13 inch 1280 by 1024 24 bit color liquid crystal display panel 13, although other sizes or types of display screens 13 may readily be employed.

The housing 11 contains a hard drive receiver 14 into which one removable hard drive 15 is inserted. A hard drive cover 14a is provided to close and seal the hard drive receiver 14 and thus protect the hard drives 15 disposed therein. In a reduced to practice embodiment of the miniaturized tactical workstation 10, the removable hard drive drives 15 are two or four gigabyte removable hard drives 15.

A two-slot VME processor box 16 is disposed in the housing 11 and is designed to receive two VME cards 17 (one of which is shown) which are slid into the VME processor box 16 from one side of the workstation 10. The VME processor card 17 may be designed in accordance with ANSI/IEEE Standard 1014–1987, described in a publication entitled "IEEE Standard for a Versatile Backplane Bus: VMEbus". The VME processor card 17 may use a model HP743i PS RISC processor (CPU), manufactured by Hewlett-Packard Company, for example. A processor cover 18 is provided to close and seal the VME processor box 16 and thus protect the VME processor cards 17 disposed therein. The processor card 17 includes 32 megabytes of random access memory, which may be expanded to 256 megabytes. The VME processor card 17 has a plurality of input and output ports 19, including a local area network (LAN) port 19a, a small computer systems interface (SCSI) port 19b, a parallel port 19c, and a serial port 19d.

An air filter 21 is disposed on a front panel 22 of the housing 11 and a fan 23 (shown clearly in FIG. 2) is disposed adjacent a side of the housing 11 that is used to draw air through the filter 21 and housing 11 to cool the electronic components of the miniaturized tactical workstation 10. A keyboard 24 and a touch panel display 25 or trackball 25 are disposed on a flat surface 26 of the housing 11 and are exposed to a user when the top cover 12 is opened to expose the viewing screen 13a of the display panel 13.

Referring to FIG. 2, a single power supply 30 is disposed on an inside surface of a rear panel 37 of the miniaturized tactical workstation 10. The single power supply 30 is used to provide supply voltages and timing (synchronization) signals, as required, to the display panel 13, the keyboard 24, the VME processor card 17, the hard drives 15, the fan 23, and to light emitting diodes 29 that indicate the status of the single power supply 30. Consequently, the use of multiple power supplies found in conventional tactical workstations is eliminated, which reduces the size and weight of the workstation 10.

Figure 3:
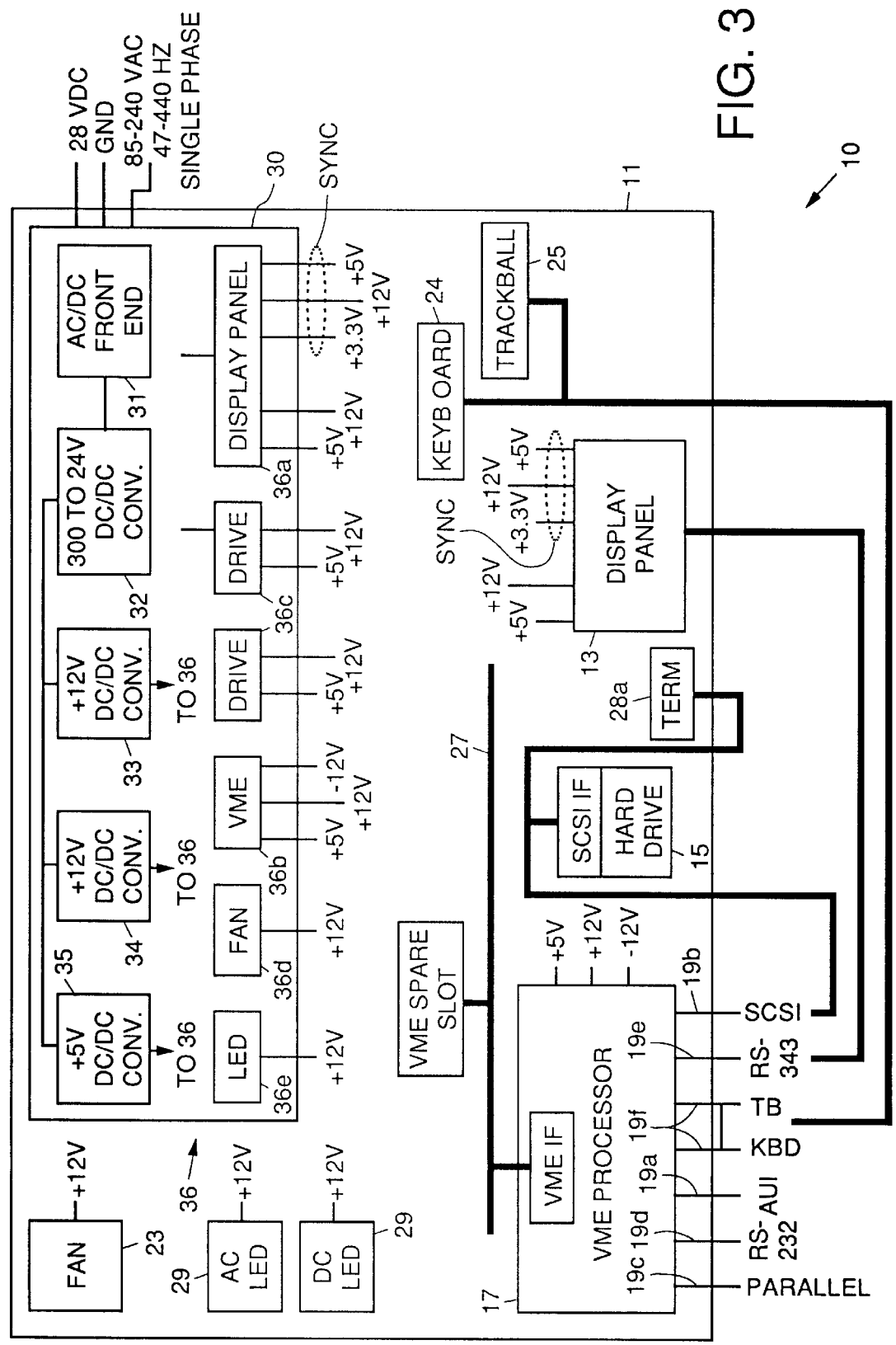
FIG. 3 is a block diagram of the portable miniaturized tactical workstation of FIG. 1 which shows details of its single power supply.

Referring to FIG. 3, it illustrates a system block diagram of the portable miniaturized tactical workstation 10, and shows details of the single power supply 30 used therein. As is shown in FIG. 3, outputs of the power supply 30 are coupled to the components of the workstation 10 as shown. The VME processor card 17 is connected to a VME bus 27. The VME processor card 17 has a LAN port 19a such as an AUI port 19a, a SCSI port 19b that is internally terminated by a terminator 28, a parallel port 19c for connection to a printer for example, an RS-232 port 19d for connection to a printer or modem, for example, a keyboard and trackball port 19e for connection to the keyboard 24 and the trackball 25, and an RS-343 port 19f for connection to the display panel 13. AC and DC light emitting diodes (LED) 29 are provided that indicate whether AC or DC power inputs to the power supply 30 are used.

The single power supply 30 has provisions for 28 VDC and 85–240 VAC 47–440 Hz single phase power inputs. The single power supply 30 comprises an AC to DC front end interface 31 (AC to DC converter 31) that includes a transformer, and four DC to DC converters 32–35. The DC to DC converters 32–35 include a 300 to 24 volt DC to DC converter 32, two +12 volt DC to DC converters 33, 34, and a +5 volt DC to DC converter 35. A plurality of output connectors 36 are provided that interface between the DC to DC converters 32–35 and the components of the workstation 10. The output voltages supplied by the output connectors 36 include +3.3 VDC, +5 VDC and +12 VDC for the display panel 13 and timing or synchronization signals (SYNC) provided by a display panel connector 36a, +5 VDC, -12 VDC and +12 VDC for the VME processor card 17 provided by a VME processor card connector 36b, +5 VDC and +12 VDC for the hard drive 15 (or drives 15) provided by hard drive connectors 36c, +12 VDC for the fan 23 provided by a fan connector 36d, and +12 VDC for AC and DC light emitting diodes 29 provided by an LED connector 36e.

The portable workstation 10 is designed to military specifications and has an operating temperature per MIL-STD-810 which is 0 to 40 degrees Celsius and −20 to 40 degrees Celsius using an optional heater (not shown). The non-operating temperature range of the workstation 10 is per MIL-STD-810 and is −25 to 60 degrees Celsius. The workstation 10 is operable to 95% humidity in and may be stored in 100% humidity. The workstation 10 has an operating altitude of 10,000 feet and a non-operating altitude of 40,000 feet per MIL-STD-810. The various covers 13, 14a, 18 seal the workstation 10 and make it weatherproof and the fan 23 and filter 21 allow the workstation 10 to be operated in sandy and dusty environments.

Thus, an improved miniaturized manportable, field deployable, tactical workstation that uses a single power supply that has substantially reduced size and weight has been disclosed. It is to be understood that the described embodiment is merely illustrative of some of the many specific embodiments which represent applications of the principles of the present invention. Clearly, numerous and varied other arrangements may be readily devised by those skilled in the art without departing from the scope of the invention.

What is claimed is:

1. A weatherproof portable tactical workstation comprising:

a housing having an integrated lockable rotatable top cover;

a display panel disposed in the top cover that has a viewing screen;

at least one removable hard drive disposed in the housing;

a hard drive receiver integral to the housing operable to contain the hard drive, the hard drive receiver further comprising a hard drive cover operable to close and seal the hard drive receiver;

at least one processor card disposed in the housing;

a processor box disposed within the housing operable to contain the processor card, the processor box further comprising a processor box cover operable to close and seal the processor box;

an air filter is disposed on the surface of the housing;

a fan disposed adjacent a surface of the housing for drawing air through the filter and the housing to cool the workstation;

a keyboard that is exposed to a user when the top cover is opened to expose the viewing screen, the keyboard protected by the top cover when the top cover is closed; and a single power supply disposed in the housing for providing the sole supply of all voltages and timing signals to the display panel, the keyboard, the processor card, the hard drive, and the fan.

2. The workstation of claim 1 wherein the display panel comprises a liquid crystal display panel.

3. The workstation of claim 1 wherein the display panel comprises a field emission display panel.

4. The workstation of claim 1 wherein the display panel comprises a plasma display panel.

5. The workstation of claim 1 which further comprises a two-slot processor box disposed in the housing for receiving the processor card.

6. The workstation of claim 1 wherein the single power supply is disposed on an inside surface of a rear panel of the workstation.

7. The workstation of claim 1 wherein the processor card has a plurality of input and output ports, including a local area network port, a small computer systems interface port, a parallel port, and a serial port.

8. The workstation of claim 1 further comprising a touch panel display disposed on the flat surface of the housing.

9. The workstation of claim 1 wherein the power supply comprises:

28 VDC and 85–240 VAC 47–440 Hz single phase power inputs;

an AC to DC converter coupled to the power inputs;

a 300 to 24 volt DC to DC converter coupled to the AC to DC converter;

a +12 volt DC to DC converter coupled to the 300 to 24 volt DC to DC converter;

a +5 volt DC to DC converter coupled to the 300 to 24 volt DC to DC converter; and a plurality of output connectors coupled between predetermined DC to DC converters and the display panel, the keyboard, the processor card, the hard drive, and the fan.

10. A manportable tactical workstation comprising:

a housing having an integrated lockable rotatable top cover;

a display panel disposed in the top cover that has a viewing screen;

a closable sealed hard drive receiver disposed in the housing;

at least one removable hard drive removably disposed in the hard drive receiver;

a hard drive cover attached to the hard drive receiver;

a closable sealed two-slot processor box disposed in the housing;

at least one processor card disposed in the processor box;

a processor cover attached to the two-slot processor box;

an airfilter is disposed on a surface of the housing;

a fan disposed in the housing for drawing air through the filter and the housing to cool the workstation;

a keyboard disposed on the surface of the housing that is exposed to a user when the top cover is opened to expose the viewing screen the keyboard protected by the top cover when the top cover is closed; and a single power supply is disposed in the housing for providing the sole supply of all voltages to the display panel, the keyboard, the processor card, the hard drive, and the fan.

11. The workstation of claim 10 wherein the display panel comprises a liquid crystal display panel.

12. The workstation of claim 11 wherein the display panel comprises a field emission display panel.

13. The workstation of claim 11 wherein the display panel comprises a plasma display panel.

14. The workstation of claim 11 wherein the single power supply is disposed on an inside surface of a rear panel of the workstation.

15. The workstation of claim 11 wherein the processor card has a plurality of input and output ports, including a local area network port, a small computer systems interface port, a parallel port, and a serial port.

16. The workstation of claim 11 wherein the power supply comprises:

28 VDC and 85–240 VAC 47–440 Hz single phase power inputs;

an AC to DC converter coupled to the power inputs;

a 300 to 24 volt DC to DC converter coupled to the AC to DC converter;

a +12 volt DC to DC converter coupled to the 300 to 24 volt DC to DC converter;

a +5 volt DC to DC converter coupled to the 300 to 24 volt DC to DC converter; and a plurality of output connectors coupled between predetermined DC to DC converters and the display panel, the keyboard, the processor card, the hard drive, and the fan.

\* \* \* \* \*